(12) United States Patent
Fandella

(10) Patent No.: US 6,871,736 B2
(45) Date of Patent: Mar. 29, 2005

(54) CONVEYANCE CHAIN

(75) Inventor: Sergio Fandella, Mogliano Veneto (IT)

(73) Assignee: Habasit AG, Reinach (CH)

( * ) Notice: Subject to any disclaimer, the term of this patent is extended or adjusted under 35 U.S.C. 154(b) by 0 days.

(21) Appl. No.: 10/753,184

(22) Filed: Jan. 5, 2004

(65) Prior Publication Data

US 2004/0140181 A1 Jul. 22, 2004

(30) Foreign Application Priority Data

Jan. 9, 2003 (IT) .................................... TV2003A0001
Mar. 5, 2003 (IT) .................................... TV2003A0039

(51) Int. Cl.[7] ............................................. B65G 17/06
(52) U.S. Cl. ...................................... 198/853; 198/850
(58) Field of Search ............................... 198/850, 852, 198/853

(56) References Cited

U.S. PATENT DOCUMENTS

| 3,513,965 | A | | 5/1970 | Miller | |
|---|---|---|---|---|---|
| 3,680,927 | A | | 8/1972 | Neureuther | |
| 3,768,631 | A | * | 10/1973 | Wahren | 198/852 |
| 3,879,935 | A | | 4/1975 | Fischer | |
| 4,153,152 | A | * | 5/1979 | Lapeyre | 198/851 |
| 4,597,492 | A | | 7/1986 | Lachonius et al. | |
| 4,640,410 | A | * | 2/1987 | Palmaer et al. | 198/867.15 |
| 4,852,722 | A | * | 8/1989 | Houseman | 198/803.7 |
| 4,886,158 | A | * | 12/1989 | Lapeyre | 198/853 |
| 4,895,248 | A | * | 1/1990 | Wahren | 198/852 |
| 5,000,311 | A | * | 3/1991 | Abbestam et al. | 198/867.14 |
| 5,402,880 | A | * | 4/1995 | Murphy | 198/852 |
| 5,404,997 | A | * | 4/1995 | Schreier et al. | 198/779 |
| 5,429,226 | A | * | 7/1995 | Ensch et al. | 198/803.14 |
| 5,586,644 | A | * | 12/1996 | Coen et al. | 198/853 |
| 5,803,236 | A | * | 9/1998 | Wahren | 198/852 |

FOREIGN PATENT DOCUMENTS

EP 0 173 865 3/1986

* cited by examiner

Primary Examiner—Khoi H. Tran
(74) Attorney, Agent, or Firm—Greer, Burns & Crain, Ltd.

(57) ABSTRACT

A conveyance chain comprising a plurality of links that are identical and longitudinally associable in succession with a similar one, each link having a head that protrudes at the front of a body supporting a contact plate, to the rear of which two wings protrude, a transverse pivot, made monolithically with the pair of wings and accommodated detachably, in a complementarily shaped slot formed in the head of an adjacent link arranged at the rear, and a bush, arranged by interlocking coupling.

22 Claims, 12 Drawing Sheets

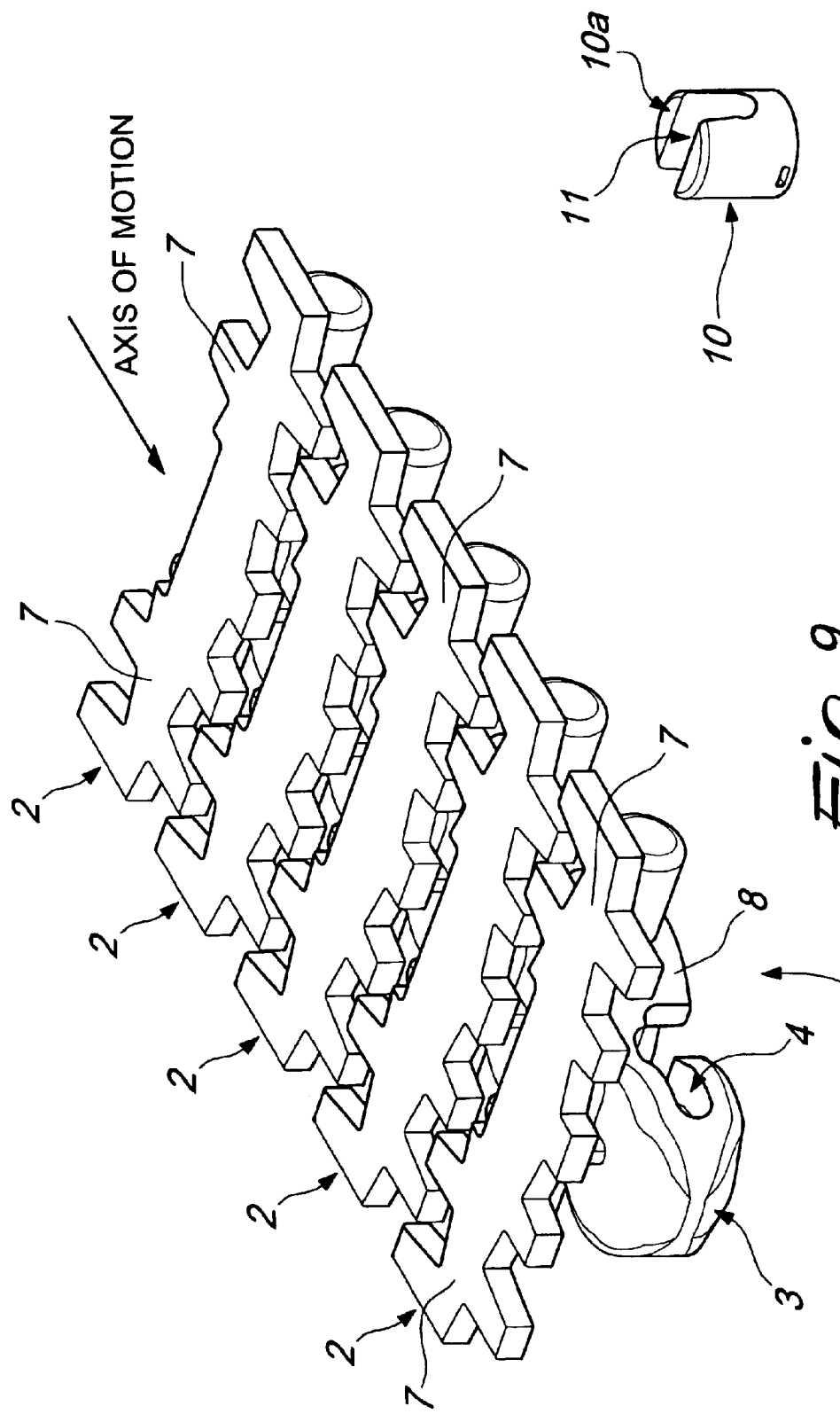

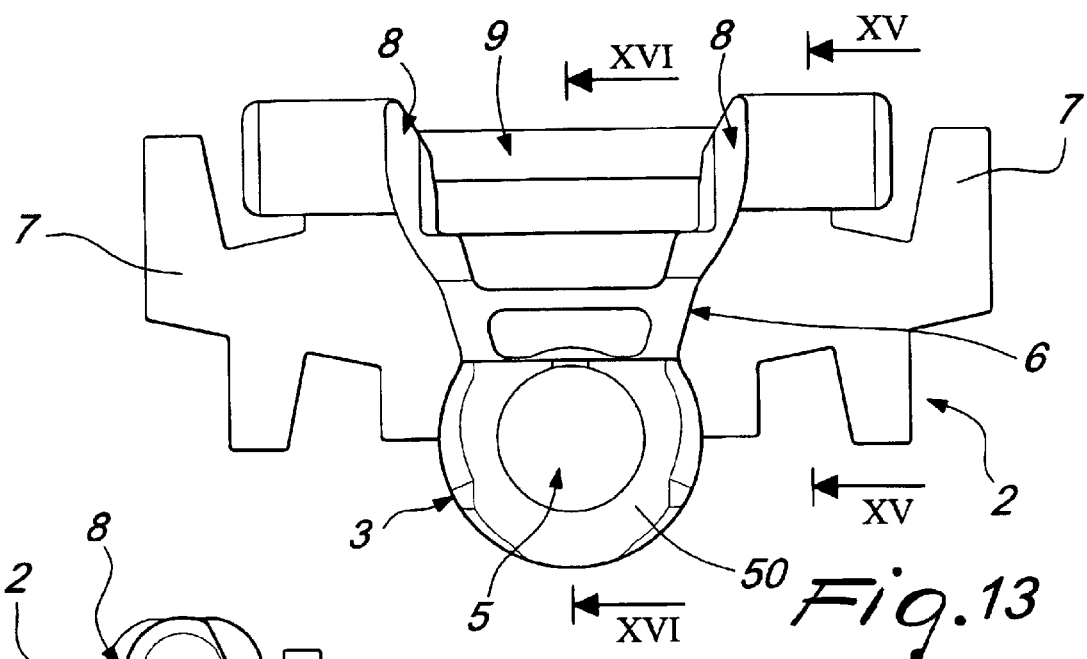
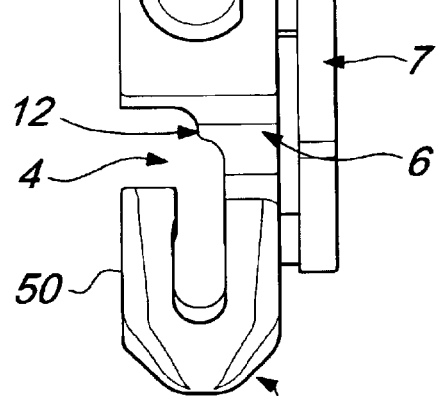
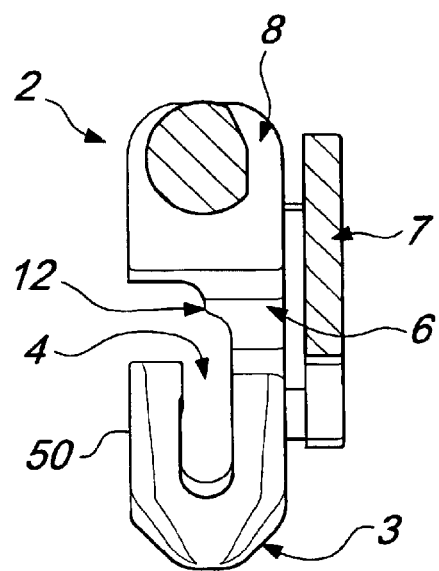
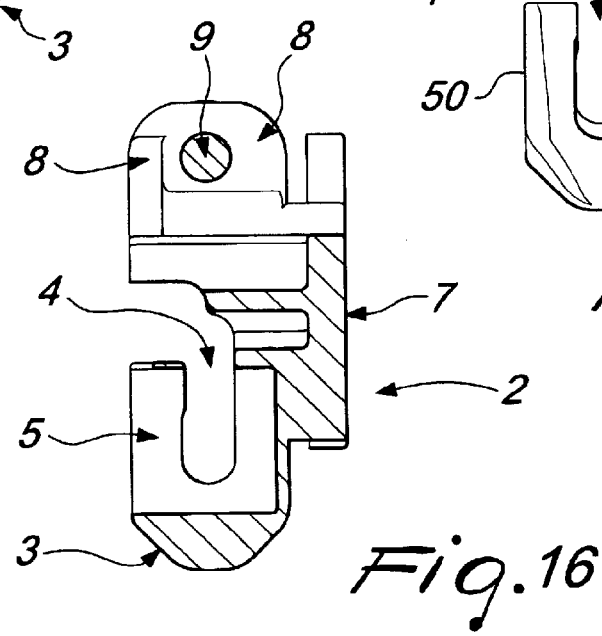

CONVEYANCE CHAIN

BACKGROUND OF THE INVENTION

The present invention relates to a conveyance chain particularly for providing industrial handling mechanisms, such as for example conveyor belts.

Conveyance chains are currently used which comprise a plurality of mutually identical links arranged sequentially on a plane so as to form an axis of motion for said chain.

Each link is associated with the next by way of a mechanism based on universal joints which allows not only to drive the various links but also allows their mutual rotation with respect to two axes that are preferably perpendicular to each other and to said axis of motion.

In this regard, Italian patent No. 1,152,656 is known which discloses a conveyance chain provided with links that comprise a main part, or head, from which two stems protrude at the rear so as to surround the head of the next link.

A first cylindrical hole is formed in the head along an axis that is generally perpendicular to the direction of motion and forms a seat in which a cylindrical element constituted by a rotating bush is rotatably associable.

A pivot can be arranged in a second hole provided transversely to the bush along an axis that is approximately perpendicular to the axis of motion and is designed to allow the pivoting of the two contiguous links: said pivot is therefore engaged between the head of one link, which can be referenced as rear link, and the stems of a contiguous link, which can be referenced as front link.

Two sleeves protrude externally to said stems of the front link and surround and accommodate the ends of the pivot.

The main drawback of said known type of conveyance chain is that it is constituted by three separate components, and this increases the work needed to assemble said chain, whose length can be even considerable: each link must in fact be associated with the next by interposing two other components.

Another drawback of these known types is constituted by the cost for producing these components.

Further, the transverse pivot is usually made of steel: accordingly, there is the drawback of having not only a high purchase cost for said pivot but also a high weight of the conveyance chain.

This entails disadvantages both of the structural type and of the energy-related type, since there is a greater expenditure of energy to move the chain.

Another important drawback is that disposing of the conveyance chain at the end of the period of useful life is very complicated to perform.

Further, the steel pivot must be inserted by interference coupling, and this entails a very laborious and difficult operation, with possible generation of rejects.

SUMMARY OF THE INVENTION

The aim of the present invention is to solve the above-noted problems, eliminating the drawbacks of the cited known art, by providing a conveyance chain that is very easy to assemble, thus reducing manufacturing costs.

Within this aim, an object of the invention is to provide a conveyance chain that has, in particular, a low cost for the production of the individual links and therefore of the components of the chain.

Another object is to provide a conveyance chain that is lightweight, this consequently entailing structural advantages and a reduced expenditure of energy to move the conveyance chain.

Another object is to provide an invention that allows to achieve easy and rapid disposal of the conveyance chain at the end of its operational life.

Another object is to provide an invention that makes it easy to position and mutually connect the components of the conveyance chain.

Another object is to provide a conveyance chain that is structurally simple and can be manufactured with conventional and known machinery and equipment.

This aim and these and other objects that will become better apparent hereinafter are achieved by a conveyance chain, comprising a plurality of links that can be mutually associated in succession with each other, each one of said links being provided with a head that protrudes at the front of a body for supporting a contact plate, to the rear of which two wings protrude, characterized in that it comprises means for mutual rotary connection, such as a pivot, which is provided monolithically with said pair of wings and can be accommodated detachably in a complementarily shaped slot formed in the head of an adjacent link, and a bush, which can be arranged by interlocking coupling in said head of the adjacent link.

Advantageously, said pivot can be accommodated, by means of a combined rotary and translational motion and/or an axial movement with respect to said link, in a complementarily shaped slot formed diametrically to the lateral surface of another head of another adjacent link, and a bush, which can be arranged by interlocking coupling in said other head.

BRIEF DESCRIPTION OF THE DRAWINGS

Further characteristics and advantages of the invention will become better apparent from the following detailed description of a particular but not exclusive embodiment thereof, illustrated by way of non-limitative example in the accompanying drawings, wherein:

FIG. 9 is a perspective view of a succession of mutually interconnected links;

FIG. 10 is a perspective view of the bush for the stable interconnection of two successive links;

FIGS. 13 and 14 are respectively a bottom view and a side view of the link of FIG. 11;

FIGS. 15 and 16 are sectional side views of the link, taken along longitudinal planes;

DESCRIPTION OF THE PREFERRED EMBODIMENTS

Figure 1:
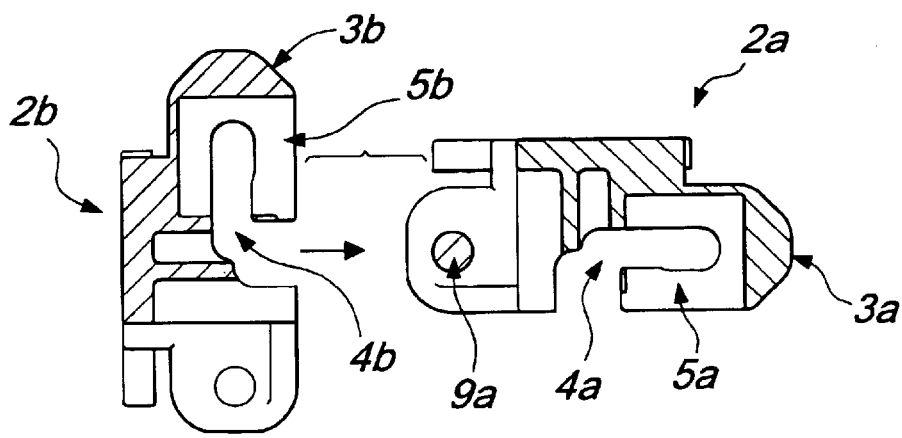
FIG. 1 is a partially sectional side view of a first link and a second link prior to interconnection.
Figure 2:
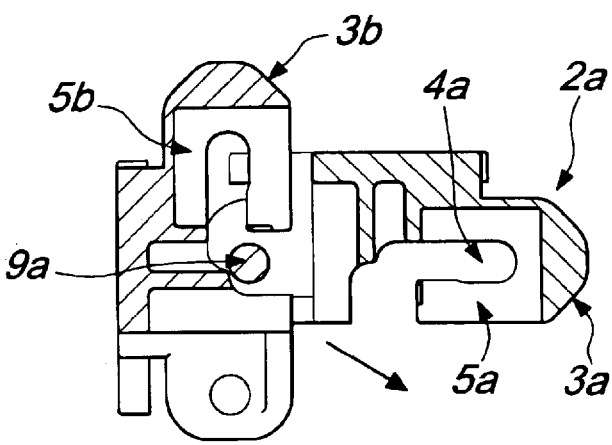
FIGS. 2 to 4 are partially sectional side views of the first and second links in various intermediate positions between the uncoupled position of FIG. 1 and a coupled position.
Figure 3:
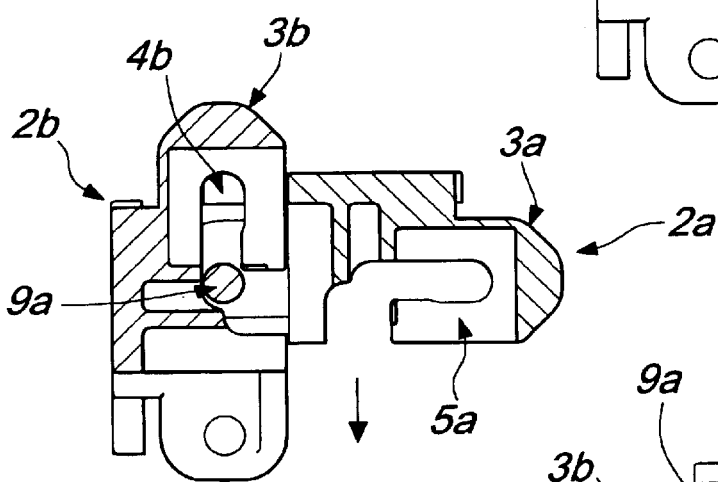
Figure 4:
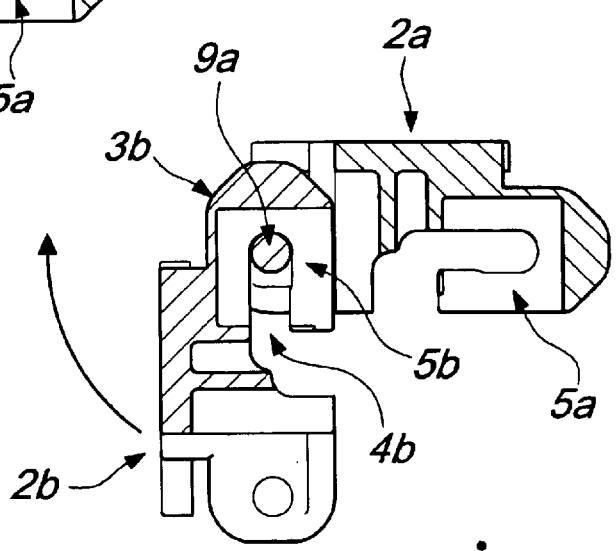
Figure 5:
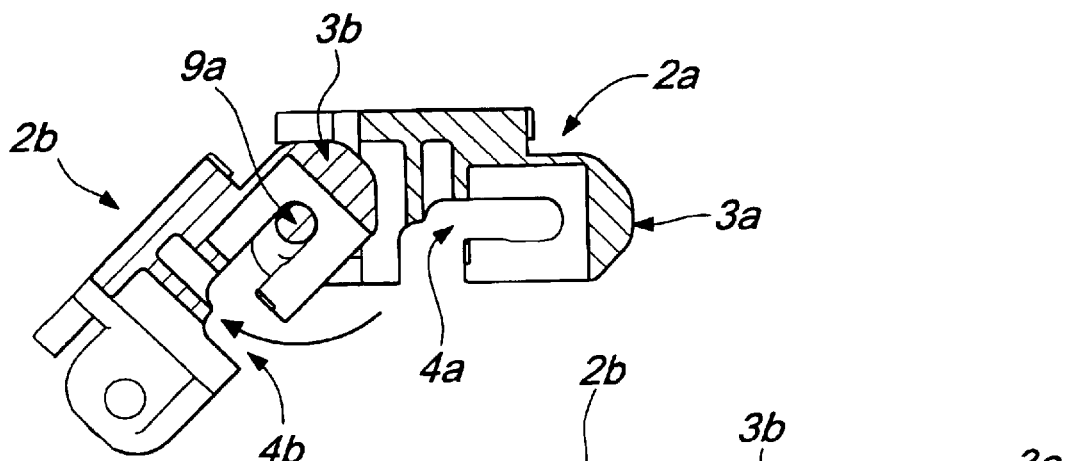
FIGS. 5 to 7 are partially sectional side views of the first and second links in successive intermediate positions.
Figure 6:
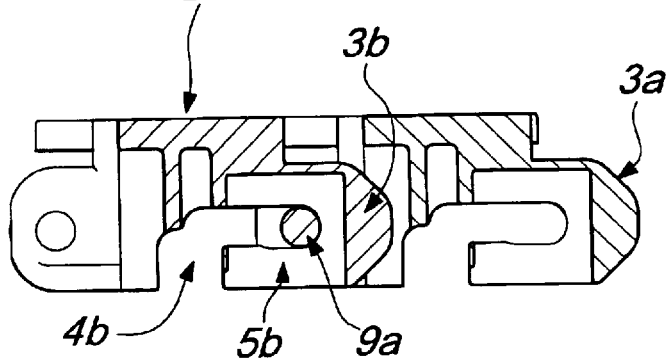

In the embodiments that follow, individual characteristics, given in relation to specific examples, may actually be interchanged with other different and compatible characteristics that exist in other embodiments.

With reference to FIG. 9, the reference numeral 1 designates a first embodiment of a conveyance chain that can be used for example to move conveyor belts.

Said chain, designated by the reference numeral 1, comprises a plurality of links, each generally designated by the reference numeral 2 in FIGS. 9 to 16.

The links 2 are advantageously mutually identical and have a head 3 that has an approximately circular plan shape and is approximately C-shaped in a side view, so as to form an approximately L-shaped slot 4 that is therefore open so as to affect the rear and central portion of the head 3.

The head 3 further has, in its flat lower surface 50, a blind hole 5 that forms an approximately cylindrical seat and is formed approximately centrally with respect to the head 3, along an axis that is perpendicular to the axis of motion.

The head 3 protrudes at the front of a body 6 for supporting a contact plate, designated by the reference numeral 7, which lies on a plane that is approximately perpendicular to the axis of motion.

In particular, the plate 7 has a flat and substantially toothed shape at the front and rear edges, so as to allow to guide the rotation of the chain 1 on a plane that is parallel to the plate 7.

Two wings, generally designated by the reference numeral 8, protrude at the rear from the body 6, mutually diverge and are connected by connection means for rotary connection, such as a transverse pivot 9, which is provided monolithically with them. The pivot 9, which is substantially cylindrical, extends along an axis that is approximately perpendicular to the plane formed by the axis of motion and by the axis of the hole 5.

The pivot 9 can be made of the same plastic material used to obtain the link 2, for example by means of a single molding operation or, as an alternative and depending on the particular use required, can be made of metallic material or of a different plastic material, for example by co-molding the link 2 and the pivot 9.

The diameter of the pivot 9 is equal to, or slightly smaller than, the diameter of the slot 4, so that it can be coupled detachably thereto; the pivot 9 constitutes a first connection means for the mutual rotary connection of the link 2 and a contiguous link.

In particular, in FIGS. 1 to 8 the reference numerals 2a and 2b designate a first link and a second contiguous link, which are advantageously identical to the links 2 described earlier.

The first link 2a has a first head 3a, which is provided with a first slot 4a and a first hole 5a; likewise, the second link 2b has a second head 3b, in which a second slot 4b and a second hole 5b are provided.

Interconnection between the links 2a and 2b occurs by initially arranging them at right angles and then moving the second link 2b toward the first pivot, designated by the reference numeral 9a, of the first link 2a. The first pivot 9a can access, and be made to slide in, the second slot 4b of the second link 2b, until it affects or reaches the blind end part of the slot 4b (see FIG. 4).

Figure 7:
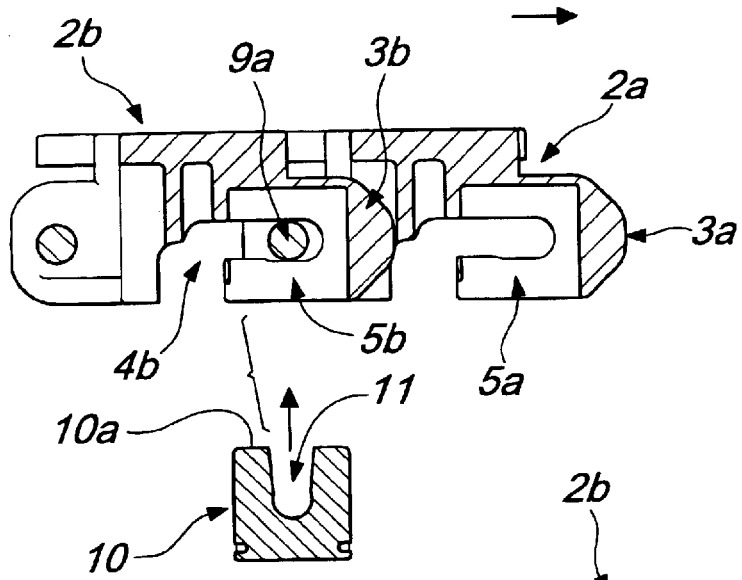
Figure 8:
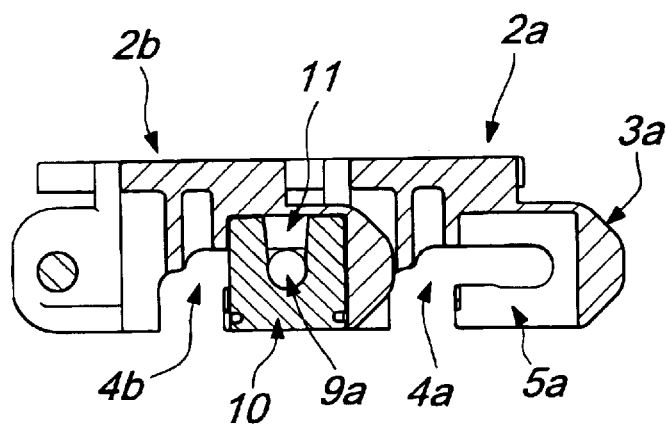
FIG. 8 is a partially sectional side view of the first and second links, stably associated by means of an interposed bush.
Figure 11:
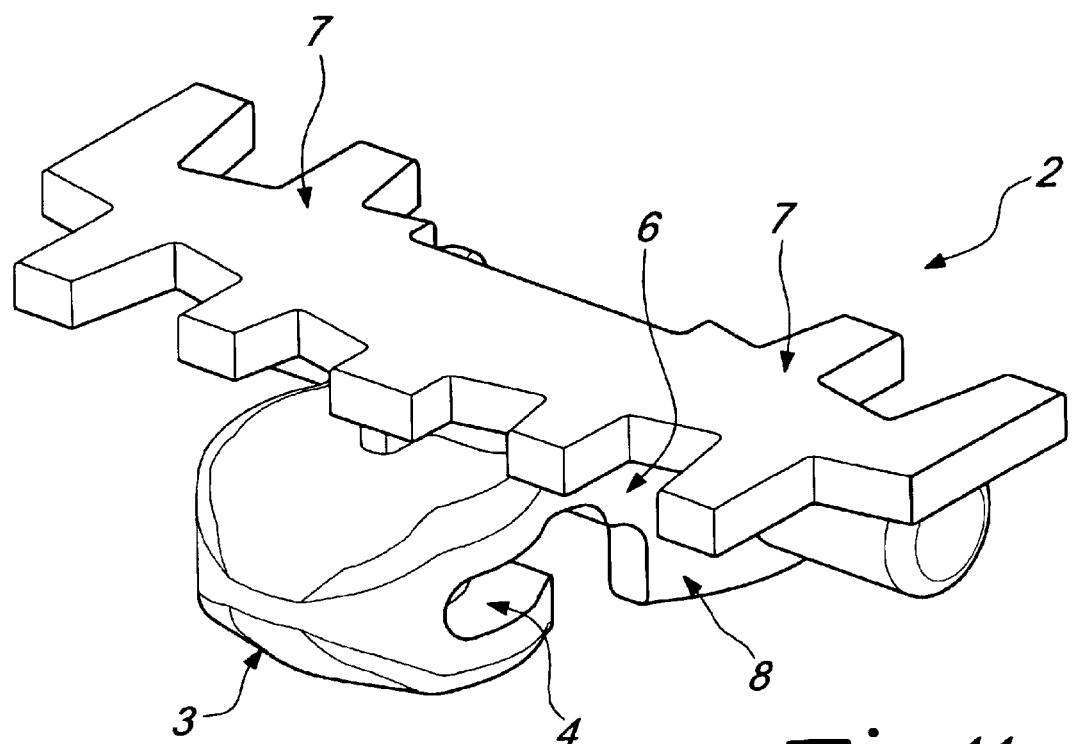
FIGS. 11 and 12 are respectively a top perspective view and a bottom perspective view of a link.
Figure 12:
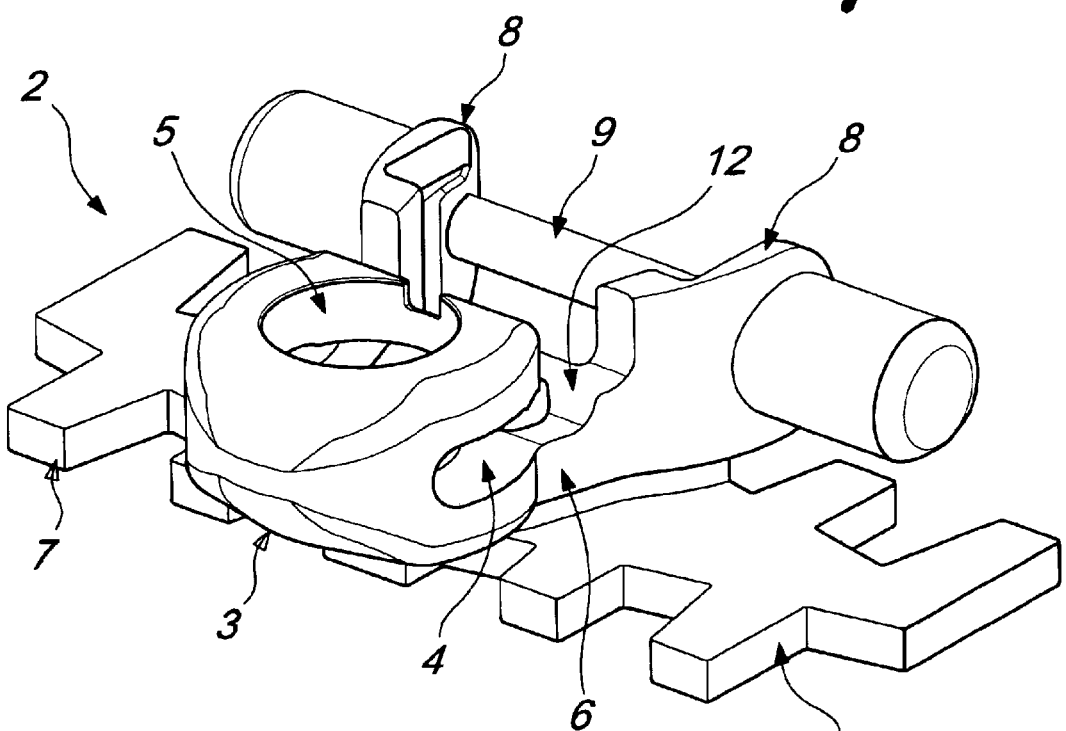
Figure 17:
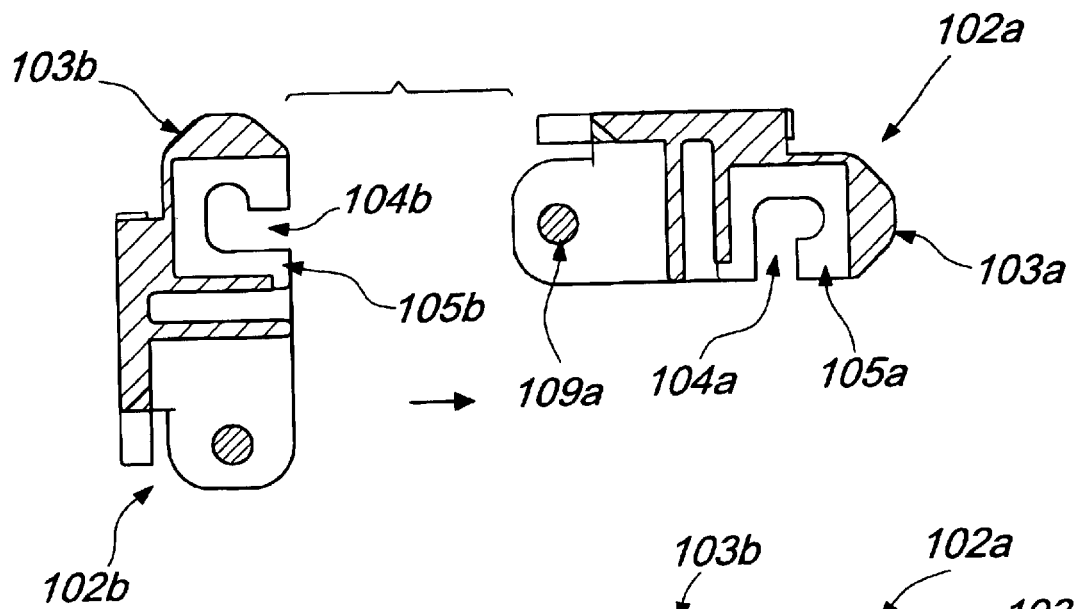
FIGS. 17 to 22 are partially sectional side views of another embodiment of two links, which are arranged with respect to each other in various positions between a first uncoupled position and a second stably coupled position.
Figure 18:
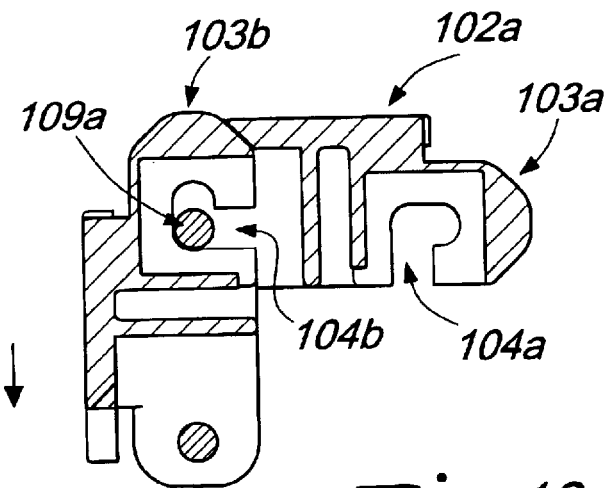

The second link 2b can then be rotated through approximately 90° about the first pivot 9a (see FIG. 6) and then subjected to a translational motion along the longitudinal axis, until the central axis of the second hole 5b is arranged at the first pivot 9a (see FIG. 7). The first pivot 9a and the second head 3b are mutually stably associable by way of the interlocking arrangement of a second connection means for mutual rotary connection, which is advantageously constituted by a bush 10, which is cylindrical and shaped approximately complementarily to the second hole 5b.

A slot 11 is formed in the bush 10 and is provided diametrically along part of its length starting from its upper end, designated by the reference numeral 10a.

In FIGS. 14 to 16, the reference numeral 12 designates a step that protrudes from the body 6 approximately proximate to the corner region of the slot 4 and is designed to reduce the breadth of the slot 4 to a size slightly larger than that of the pivot 9; in this manner, the step 12 reduces the possibilities of accidental extraction of the pivot 9 from said slot.

Operation is therefore as follows: with reference to FIGS. 1 to 8, it has been shown that each individual link can be associated with the preceding one by way of a combined rotary and translational motion, followed by a longitudinal movement to allow the insertion of the bush within the central hole and the simultaneous accommodation of the pivot in the slot of said bush.

It has thus been found that the invention has achieved the intended aim and objects, a conveyance chain having been devised which is constituted by just two components, particularly the links and the bushes, since the pivot is integrated and coupling is allowed by the presence of the open slot 4.

Accordingly, the chain can be assembled very rapidly and easily, reducing manufacturing costs considerably.

The provision of said two separate components is very economical, since the links, which comprise the head, the body, the plates, the wings and the pivot, can be provided entirely by means of a single molding operation.

As an alternative, if one needs to have a chain with very strong interconnection pivots, as previously mentioned it is possible to obtain by co-molding a link that includes pivots made for example of steel.

The invention is lightweight and compact, accordingly offering considerable structural advantages and most of all a high saving in the energy expended to move the conveyance chain.

Said chain, moreover, can be disposed of rather simply and rapidly at the end of its operational life.

The invention is of course susceptible of numerous modifications and variations, all of which are within the scope of the same inventive concept.

Thus, for example, in FIGS. 17 to 24 the reference numeral 102a designates a second embodiment of a first link, particularly for providing a conveyance chain, which can be used preferably in particular conditions, such as for paths with limited radii of curvature.

The first link 102a has a first head 103a, which is provided with a first hole 105a and whose dimensions are smaller than those of the preceding head, since it has a first slot 104a that is approximately L-shaped and is shorter than the slot shown in the first embodiment.

Moreover, the first slot 104a has an approximately constant width, and thus lacks the step 12 used in the first embodiment of the invention.

FIGS. 17 to 22 illustrate the method for interconnecting the first link 102a and a second link 102b, which is advantageously identical to the preceding one, and is accordingly provided with a second head 103b in which a second slot 104b and a second hole 105b are provided.

The interconnection between the first and second links 102a and 102b requires a preliminary rotation through approximately 90° of the second link, followed by its movement toward a first pivot, designated by the reference numeral 109a, of a first link 102a.

Figure 19:
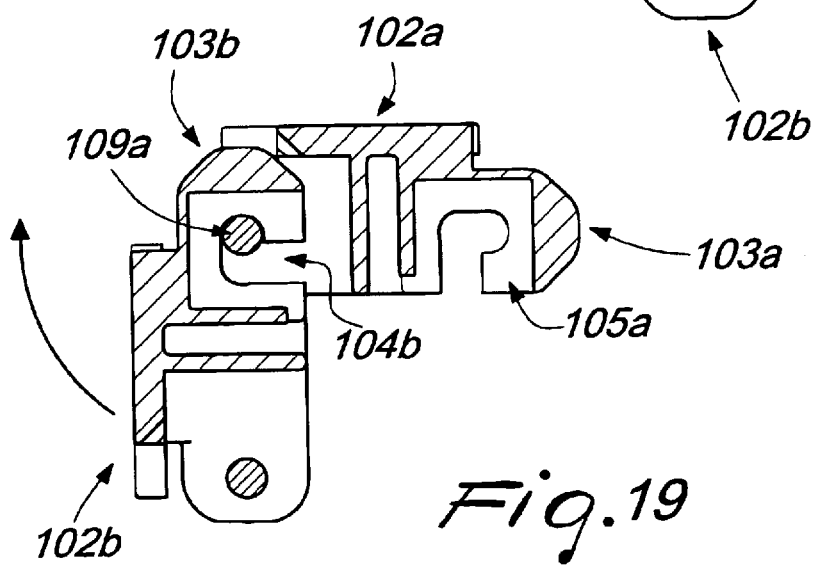
Figure 20:
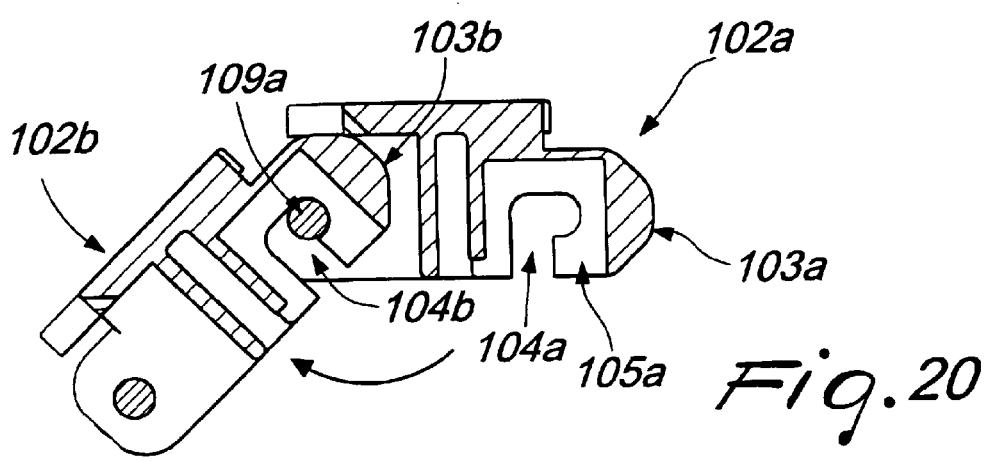
Figure 21:
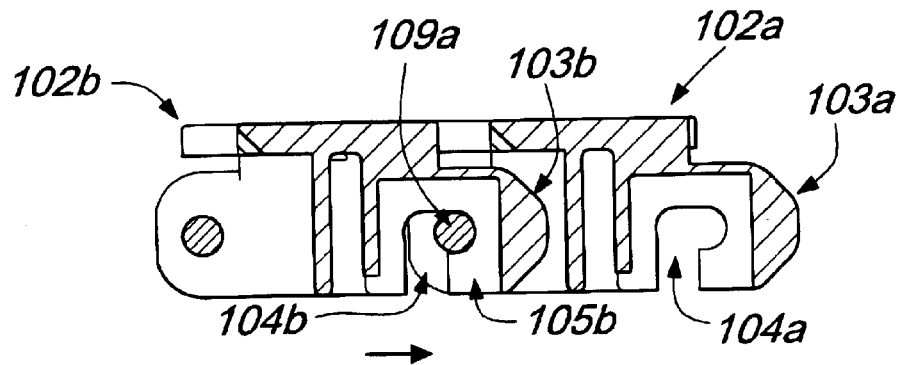
Figure 22:
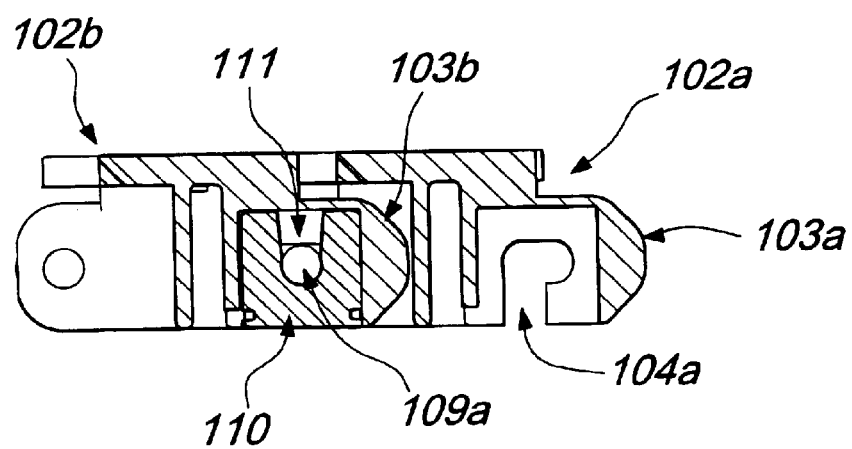
Figure 23:
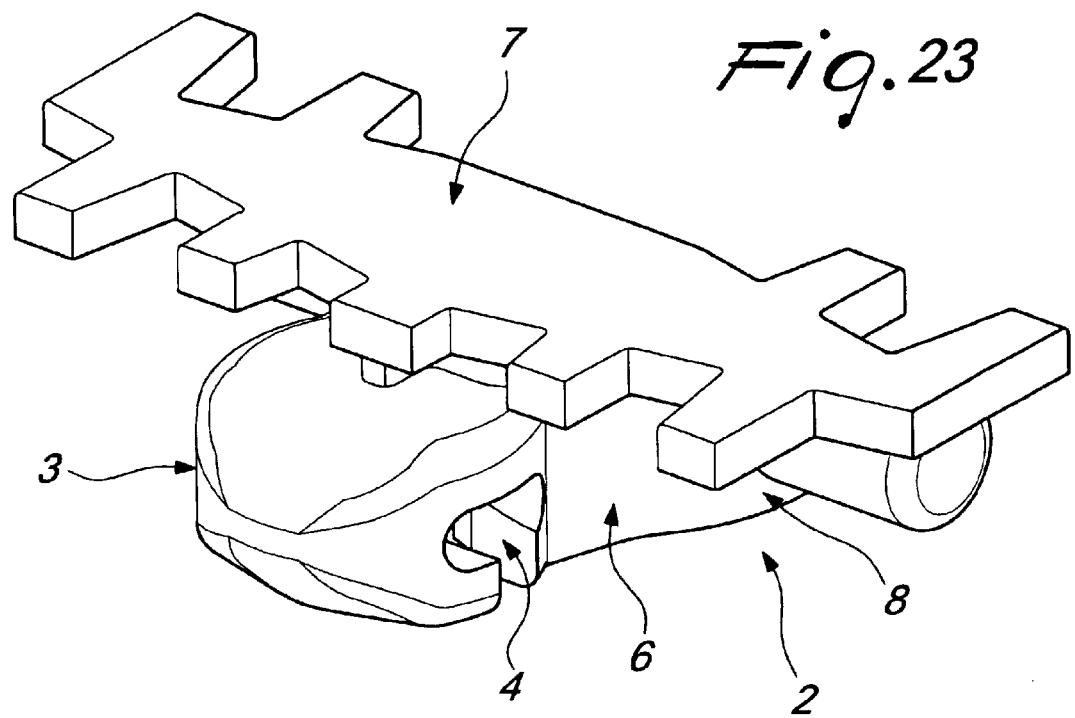
FIGS. 23 and 24 are respectively a top perspective view and a bottom perspective view of the other embodiment of the link.
Figure 24:
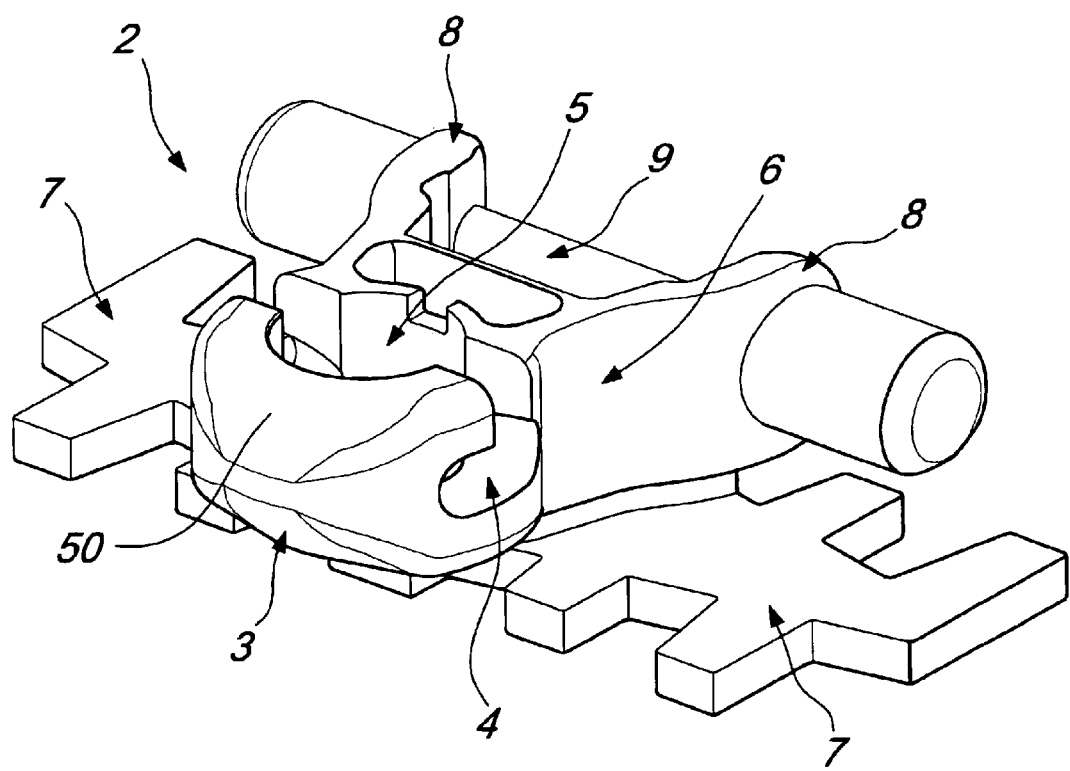

The first pivot 109a is made to slide in the second slot 104b, which is open at one end, of the second link 102b, until it affects the end part of the slot 104b (FIG. 19).

Then the second link 102b can be rotated through approximately 90° about the first pivot 109a (see FIG. 21) and then made to perform a translational motion along the longitudinal axis until the central axis of the second hole 5b is arranged at the first pivot 109a. The pivot 109a and the second head 103b are mutually stably associable by way of the interlocking arrangement of a cylindrical bush 110, which is shaped approximately complementarily to the second hole 105b and has a slot 111 formed diametrically, along part of its length, at its upper base.

Figure 28:
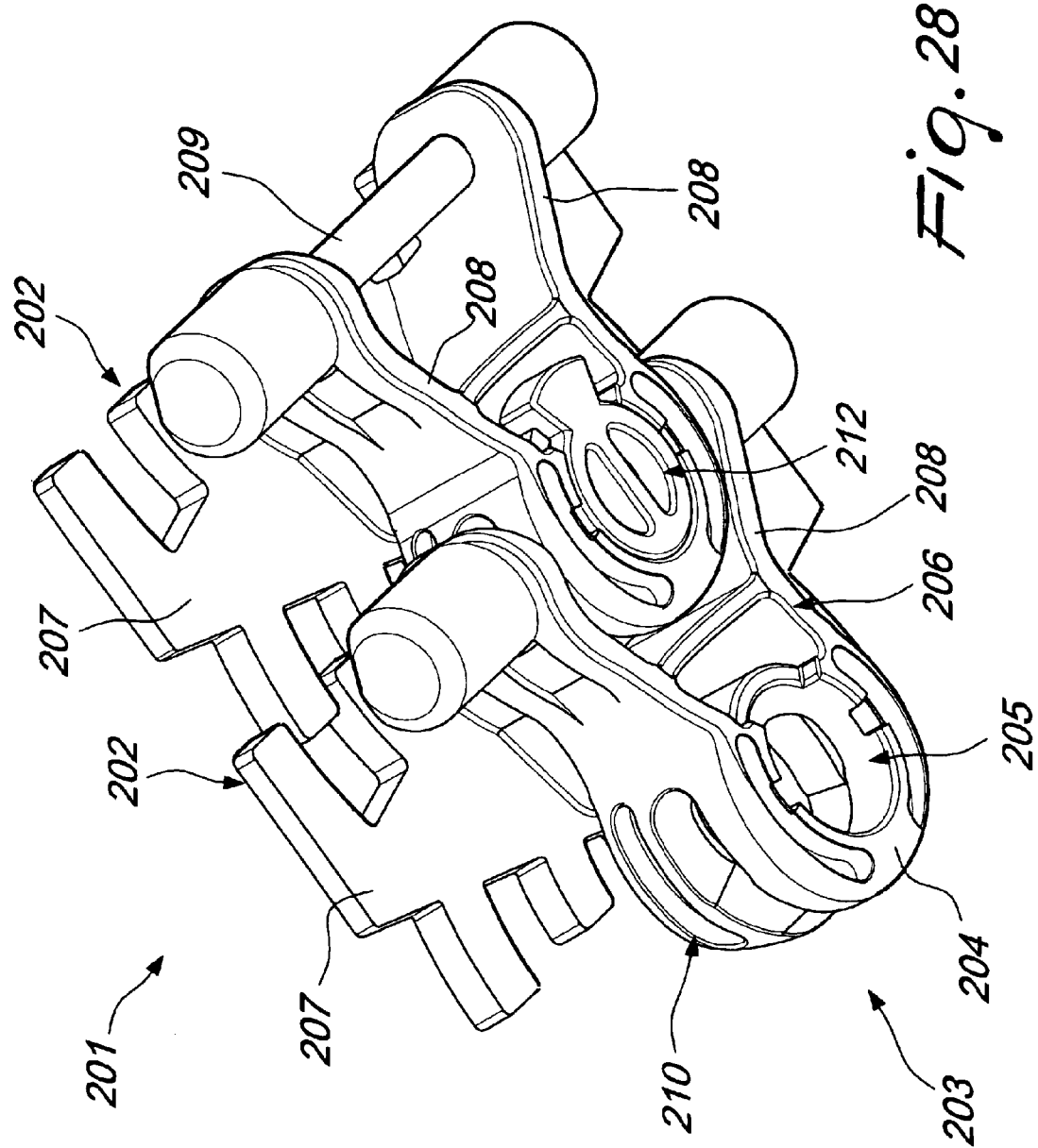
FIG. 28 is a bottom perspective view of two mutually interconnected links.
Figure 29:
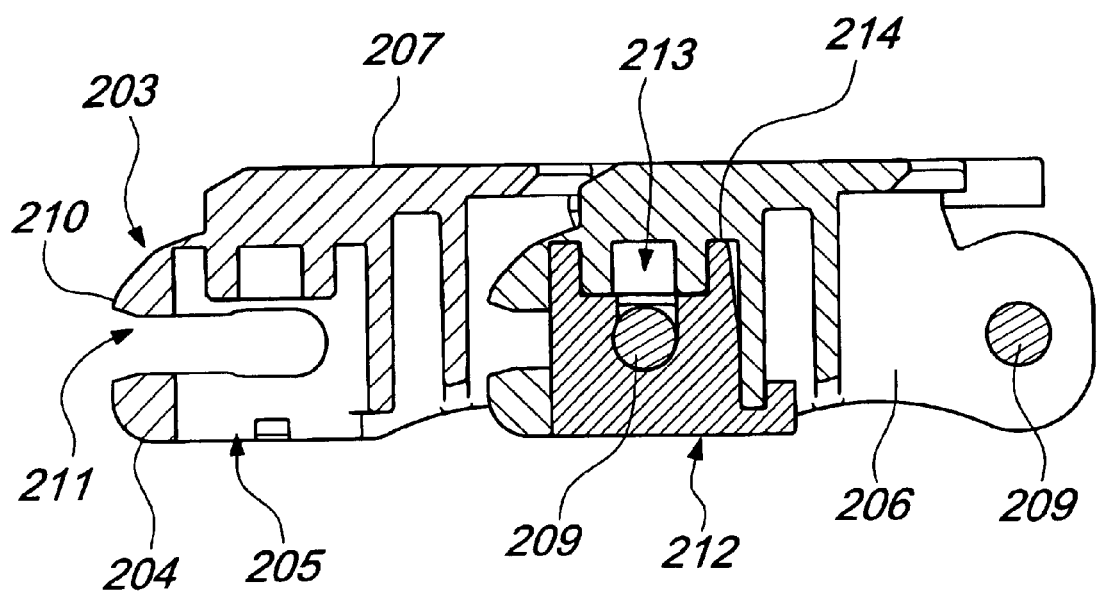
FIG. 29 is a longitudinal sectional view of the link of FIG. 28.
Figure 30:
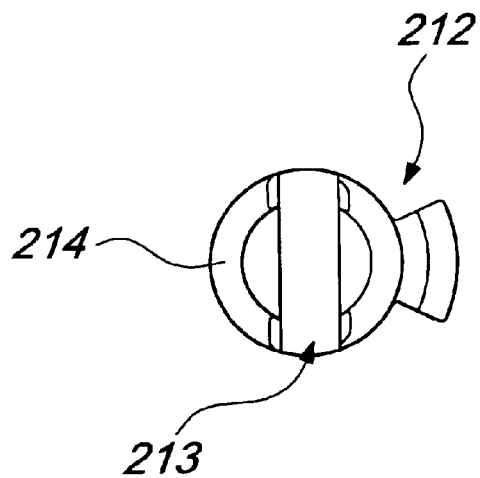
FIGS. 30 and 31 are a top view and a side view of the bush of FIG. 29.
Figure 31:
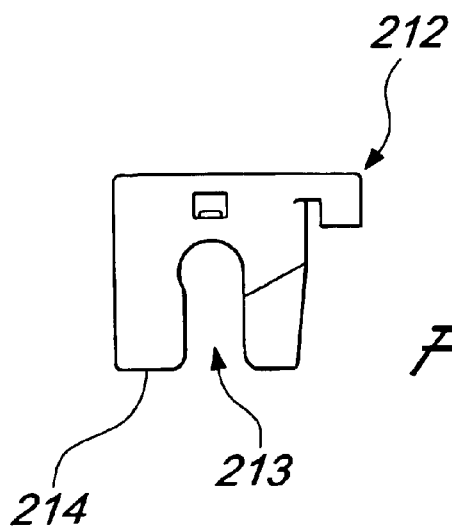

With reference to FIG. 28, the reference numeral 201 designates a conveyance chain that can be used for example to move conveyor belts.

Said chain comprises a plurality of links, each of which is generally designated by the reference numeral 202.

The links 202, which are advantageously mutually identical, have a head 203 that is preferably cylindrical and have, in the flat lower surface 204 thereof, a hole 205 that is preferably a blind hole and forms an approximately cylindrical seat provided approximately centrally to the head 203 along an axis that is perpendicular to the axis of motion.

The head 203 protrudes at the front of a supporting body 206 for a contact plate, designated by the reference numeral 207, which lies on a plane that is approximately perpendicular to the axis of motion. In particular, the contact plate 207 is flat and substantially toothed at its front and rear edges, so as to allow to guide the rotation of the chain 201 on a plane that is parallel to the contact plate 207.

Two wings, generally designated by the reference numeral 208, extend to the rear from the body 206, mutually diverge and are connected by a transverse pivot 209 that is formed monolithically with said wings.

The pivot 209, which is approximately cylindrical, is provided along an axis that is approximately perpendicular to the plane formed by the axis of motion and by the axis of the hole 205.

The pivot 209 can be made of the same plastic material used to obtain the link 202, for example by means of a single molding operation or, as an alternative and depending on the particular use required, can be made of metallic material or of a different plastic material, for example by co-molding the link 202 and the pivot 209.

A slot 211 is formed at the lateral surface 210 of the head 203 that is directed away from the body 206, along a diametrical plane that is approximately parallel to the plane of arrangement of the contact plate 207, and gives said head an approximately C-shaped configuration in a diametrical sectional view taken along a plane that is perpendicular to the contact plate 207, so as to form a temporary engagement seat for a pivot 209 of an adjacent additional link 202.

The diameter of the pivot 209 is therefore approximately equal to, or slightly smaller than, the width of the slot 211, so that it can be coupled detachably thereto: the pivot 209 constitutes a first means for the rotary connection of the link 202 to a contiguous link.

Figure 25:
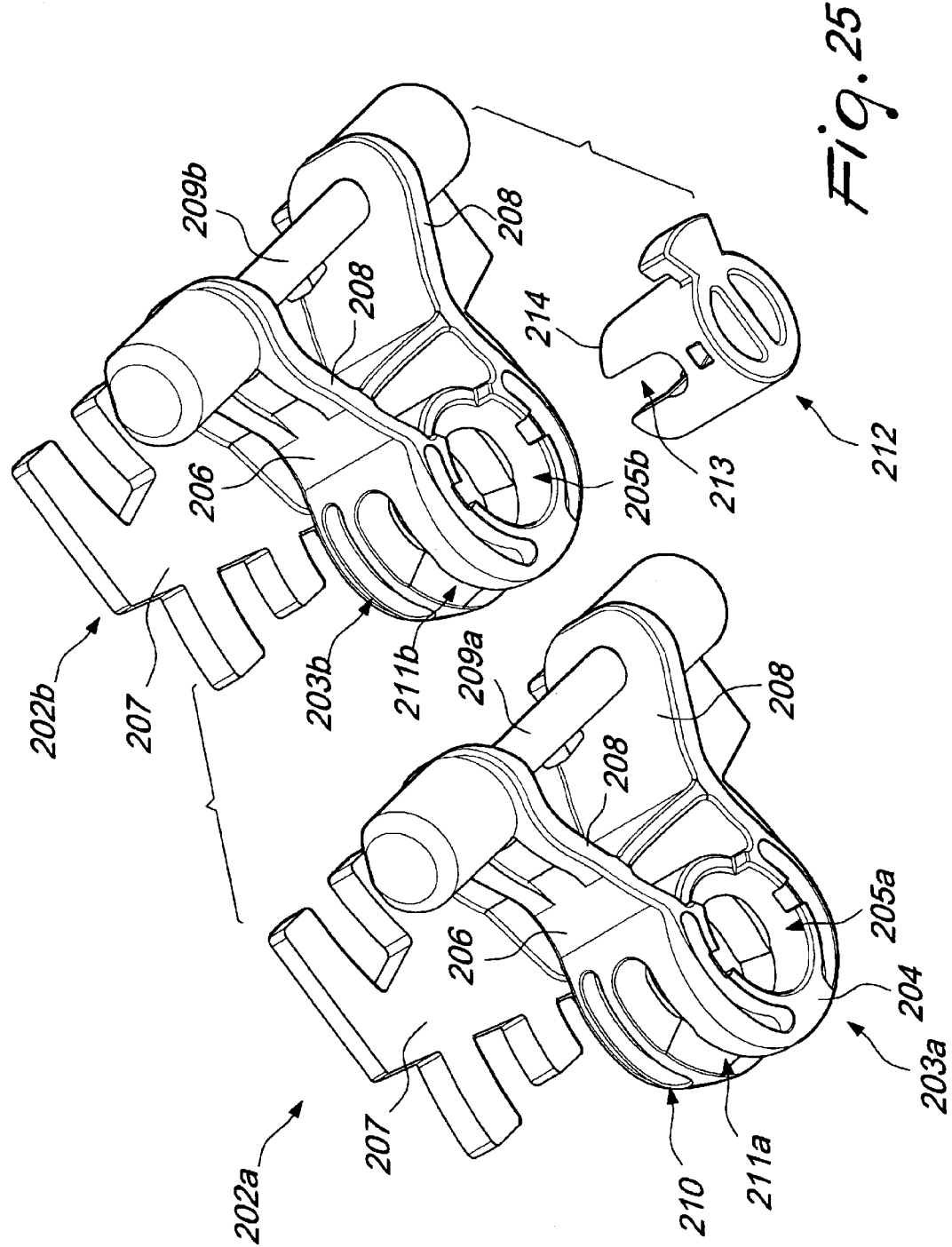
FIG. 25 is a bottom perspective view of two links arranged side by side and of a bush.
Figure 26:
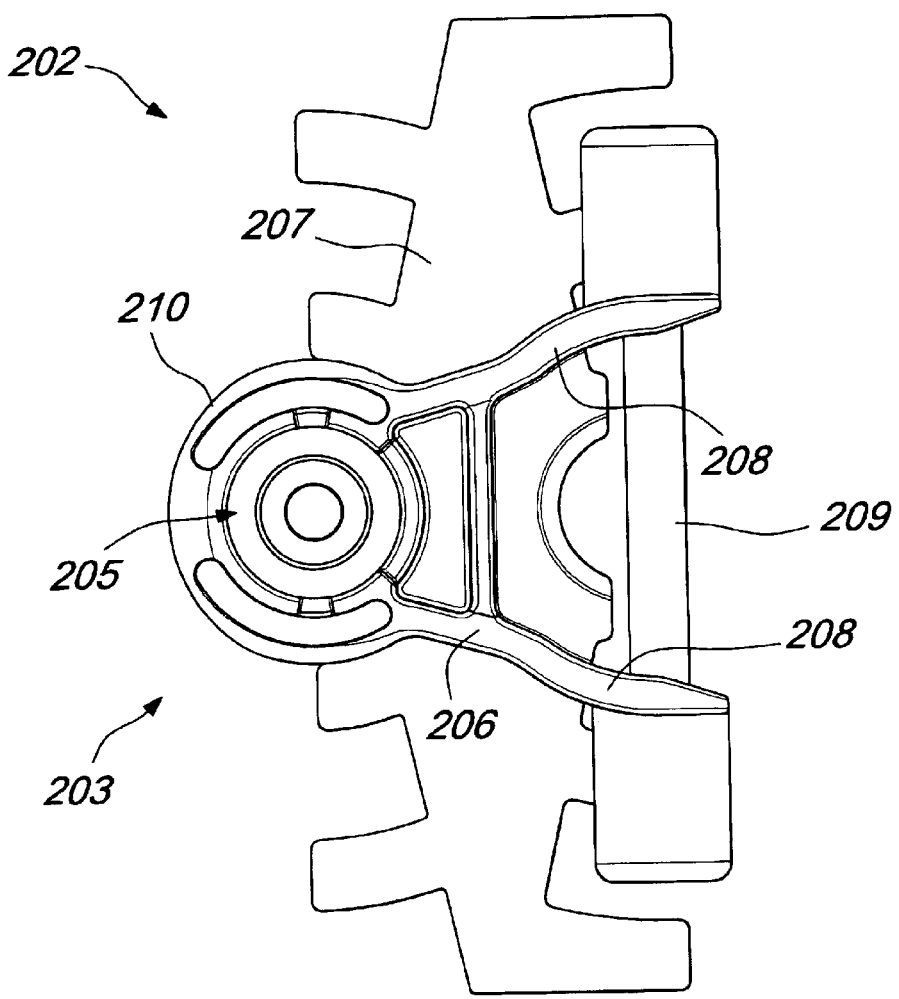
FIG. 26 is a top view of a single link.
Figure 27:
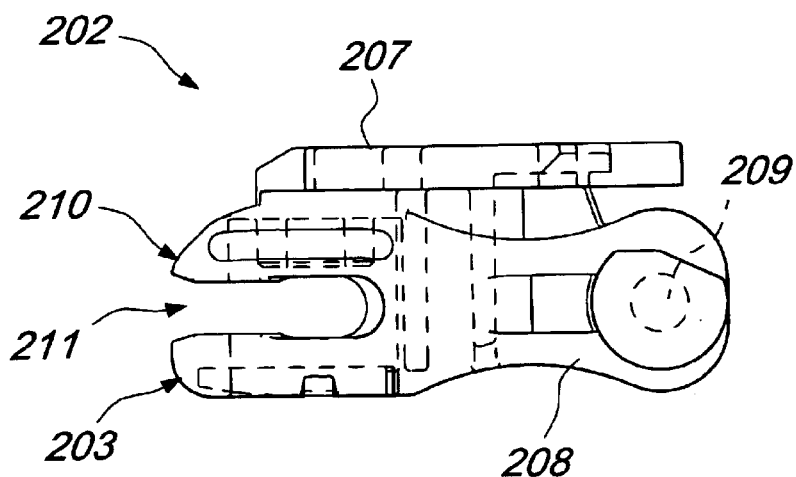
FIG. 27 is a side view of a link.

In particular, in FIGS. 25 and 28 the reference numerals 202a and 202b designate a first link and a second contiguous link, which are advantageously identical to the previously described links 202.

The first link 202a has a first head 203a, which is provided with a first slot 211a and a first hole 205a; likewise, the second link 202b has a second head 203b, in which a second slot 211b and a second hole 205b are formed.

The interconnection between the links 202a and 202b occurs by arranging the two links side by side and making them perform a simple motion along an axis that is longitudinal to them until the first pivot 209a is arranged at the facing second slot 211b of the second link 202b, until it is arranged approximately halfway along the diameter of the second hole 205b.

The first pivot 209a and the second head 203b are mutually stably associable by way of the interlocking arrangement of a second means for mutual rotary connection, which is advantageously constituted by an approximately cylindrical bush 212 that is shaped approximately complementarily to the second hole 205b.

Said bush in fact has a slot 213, which is obtained diametrically along part of its length starting from its upper end 214, for partially accommodating said pivot.

Operation is therefore as follows: with reference to the cited figures, it has been shown that each individual link can be associated with the preceding one by arranging said links on a same plane and then applying an axial motion to them until it becomes possible to insert the pivot of one link in the slot of the other link and to insert the bush in the central hole.

It has thus been shown that this solution, too, has achieved the intended aim and objects, a conveyance chain having been devised which is constituted by just two components, in particular the links and the bushes, the pivot being integrated and the coupling being allowed by the presence of the open slot 211.

Accordingly, the chain can be assembled very rapidly and easily, reducing manufacturing costs considerably.

The provision of said two separate components is very economical, since the links, which comprise the head, the body, the plates, the wings and the pivot, can be provided entirely by means of a single molding operation.

As an alternative, if one needs to have a chain with very strong interconnection pivots, as previously mentioned it is possible to obtain by co-molding a link that embeds pivots made for example of steel.

The invention is lightweight and compact, accordingly offering considerable structural advantages and especially a high saving in the energy expended to move the conveyance chain.

Said chain, moreover, can be disposed of rather simply and rapidly at the end of its operational life.

The materials used, as well as the dimensions that constitute the individual components of the invention, may of course be more pertinent according to specific requirements.

Different technical means for performing the functions as set forth in the description of the illustrated preferred embodiment can be envisaged by the skilled persons, which are to be considered comprised by the scope of the appended claims.

The disclosures in Italian Patent Applications No. TV2003A000001 and TV2003A000039 from which this application claims priority are incorporated herein by reference.

What is claimed is:

1. A conveyance chain, comprising: a plurality of links mutually associable in succession with each other, each one of said links being provided with a body, with a slot, with a head that protrudes at a front of the body, with a contact plate supported at said head, and with two wings that protrude from said body; connection means for mutual rotary connection of the links that comprise a pivot, which is monolithical with said wings and is detachably accommodable, through a combined rotary and translational motion and/or a motion performed axially to the link, in said slot that is shaped complementarily thereto in the head of an adjacent link, and a bush, which is arrangeable by interlocking coupling in the head of the adjacent link.

2. The chain of claim 1, wherein said head of the adjacent link has a substantially circular plan shape and a C-shaped configuration in a side view, so as to form for said slot an L-shaped configuration that has, at one end, an opening adapted to allow coupling to a pivot of the adjacent link.

3. The chain of claim 2, wherein said slot extends at least at a rear region and/or central region of the head of the adjacent link with said opening directed toward said body, has a height that is equal to, or slightly greater than, the diameter of said pivot, which constitutes a first means for mutual rotary connection of said link with another adjacent link.

4. The chain of claim 3, wherein said slot has a height that is substantially constant and approximates, or is slightly greater than, the diameter of said pivot.

5. The chain of claim 3, wherein said opening of said slot has an inlet that tapers at a portion whose height is substantially equal to the diameter of said pivot.

6. The chain of claim 5, wherein tapering of said slot is provided by way of a step provided protruding from the head of the adjacent link proximate to a corner region of said slot.

7. The chain of claim 5, wherein said head has, at one of its lower surfaces, a blind hole that forms a substantially cylindrical seat provided along an axis that is substantially perpendicular to an axis of motion, said hole being connected to said slot.

8. The chain of claim 5, wherein said bush is accommodable in said hole formed in the head of the adjacent link and has a slot that is provided diametrically along part of its length starting from an upper end thereof in order to partially accommodate said pivot.

9. The chain of claim 8, wherein said bush provides a stable rotary connection between said pivot of said link and the head of the adjacent link, said bush constituting a second means for mutual rotary connection.

10. The chain of claim 1, wherein said pivot is made of a same plastic material as that of said link, and single-molded together with said link.

11. The chain of claim 1, wherein said pivot is made of metallic material, co-molded with said link.

12. A conveyance chain, made of a plurality of links mutually associable in succession with each other, each one of said links being provided with a body, with a slot, with a head that protrudes at a front of the body, with a contact plate supported at said head, and with two wings that protrude from said body; connection means for mutual rotary connection of the links that comprise a pivot, which is monolithical with said wings and is detachably accommodable by way of an axial movement with respect to said link, in a complementarily shaped slot formed diametrically with respect to a lateral surface of the head of an adjacent link, and a bush, which is arrangeable by interlocking in the head of the adjacent link.

13. The chain of claim 12, comprising mutually identical links that have a supporting body, a contact plate, a cylindrical head and, in a flat lower surface of said head, a blind hole that forms a substantially cylindrical seat provided substantially centrally to said head, along an axis that is perpendicular to an axis of motion of the chain, said head protruding at a front of the supporting body for supporting the contact plate that lies on a plane that is substantially perpendicular to the axis of motion, and two wings that protrude from said body at a rear part thereof, mutually diverge and are connected by a transverse pivot that is monolithical therewith.

14. The chain of claim 12, wherein said head has, at a lower surface, a blind hole that forms a substantially cylindrical seat extending along an axis that is substantially perpendicular to an axis of motion of the chain, said hole being connected to said slot.

15. The chain of claim 14, wherein a slot is formed at a lateral surface of said head that is directed away from said body, along a diametrical plane that is substantially parallel to a plane of arrangement of said contact plate, said head having a C-shaped configuration in a diametrical cross-section taken along a plane that is perpendicular to said contact plate, so as to form a seat for temporary engagement of said pivot of an additional adjacent link.

16. The chain of claim 15, wherein said pivot has a diameter substantially equal to, or slightly smaller than, a width of said slot and constitutes a first means for mutual rotary connection of said link and of a contiguous link.

17. The chain of claim 16, wherein the links form an interconnection by side by side arrangement thereof and movement along an axis that is longitudinal to the links, until the pivot of one link is arranged at a facing slot of the other link, said pivot being arranged halfway along the diameter of said hole.

18. The chain of claim 17, wherein said pivot of one link and said slot of an adjacent link are mutually stably associated by way of the interlocking arrangement of a second means for mutual rotary interconnection, which is constituted by a cylindrical bush that is shaped complementarily to said hole.

19. The chain of claim 18, wherein said bush is accommodated in the hole formed in the head of an adjacent link and has a slot that is formed diametrically along part of its length starting from an upper end thereof, in order to partially accommodate said pivot.

20. The chain of claim 19, wherein said bush provides a stable and rotary interconnection between said pivot of said link and the head of the adjacent link, said bush constituting a second means for mutual rotary interconnection.

21. The chain of claim 12, wherein said pivot is made of a same plastic material as said link, and single-molded together with said link.

22. The chain of claim 12, wherein said pivot is made of metallic material, co-molded with said link.

* * * * *